United States Patent
Witts et al.

(10) Patent No.: US 12,228,431 B2
(45) Date of Patent: Feb. 18, 2025

(54) ROTARY POSITION SENSING APPARATUS AND METHOD

(71) Applicant: Kyocera AVX Components (Werne) GmbH, Werne (DE)

(72) Inventors: David Witts, Cambridge (GB); Timothy Biggs, Cambridge (GB); Paul Smith, Cambridge (GB); Peter Constantinou, Cambridge (GB)

(73) Assignee: Kyocera AVX Components (Werne) GMBH, Werne (DE)

( * ) Notice: Subject to any disclaimer, the term of this patent is extended or adjusted under 35 U.S.C. 154(b) by 0 days.

(21) Appl. No.: 18/349,556

(22) Filed: Jul. 10, 2023

(65) Prior Publication Data

US 2024/0011800 A1    Jan. 11, 2024

Related U.S. Application Data

(63) Continuation of application No. 17/048,149, filed as application No. PCT/GB2018/051453 on May 29, 2018, now Pat. No. 11,698,275.

(51) Int. Cl.
    *G01D 5/22*        (2006.01)
(52) U.S. Cl.
    CPC ............... *G01D 5/225* (2013.01); *G01D 5/22* (2013.01); *G01D 5/2258* (2013.01); *G01D 5/2275* (2013.01)
(58) Field of Classification Search
    CPC ........ G01D 5/22; G01D 5/225; G01D 5/2258; G01D 5/2275

(Continued)

(56) References Cited

U.S. PATENT DOCUMENTS

| 6,011,389 A | 1/2000 | Masreliez et al. |
| 6,259,249 B1 * | 7/2001 | Miyata ................. G01D 5/2086 324/207.17 |

(Continued)

FOREIGN PATENT DOCUMENTS

| CN | 1950676 A | 4/2007 |
| DE | 102008012922 | 9/2009 |

(Continued)

OTHER PUBLICATIONS

Search Report for PCT/GB2018/051453 mailed on May 2, 2019, 19 pages.

*Primary Examiner* — Eman A Alkafawi
*Assistant Examiner* — Rahul Maini
(74) *Attorney, Agent, or Firm* — Dority & Manning, P.A.

(57) ABSTRACT

Rotary position sensors are provided. In one example implementation, a rotary position sensor can include a first member and a second member, one of the first and second members having a transmit aerial and a receive aerial and the other of the first and second members having an intermediate coupling element. The receive aerial has at least one receive conductive winding arranged to form a first set of current loops and a second set of current loops. The intermediate coupling element comprises a conductive material arranged in a pattern. The pattern of the intermediate coupling element and the layout of the first and second set of current loops are mutually arranged such that any electromotive force induced in the first set of current loops by a background magnetic field is substantially balanced by an electromotive force induced in the second set of current loops by the background magnetic field.

6 Claims, 14 Drawing Sheets

(58) Field of Classification Search
USPC .................................................. 324/207.17
See application file for complete search history.

(56) References Cited

U.S. PATENT DOCUMENTS

| | | | |
|---|---|---|---|
| 9,470,505 B2* | 10/2016 | Ely | ............... G01D 5/2046 |
| 9,835,473 B2 | 9/2017 | Nahum | |
| 2009/0174396 A1 | 7/2009 | Howard | |
| 2012/0176123 A1 | 7/2012 | Manabe et al. | |
| 2014/0167788 A1 | 6/2014 | Fontanet | |
| 2020/0400465 A1* | 12/2020 | Fontanet | ........... G01D 5/2275 |

FOREIGN PATENT DOCUMENTS

| | | |
|---|---|---|
| DE | 102015220650 | 4/2017 |
| EP | 0743508 | 11/1996 |
| WO | WO 2005/098370 | 4/2005 |

* cited by examiner

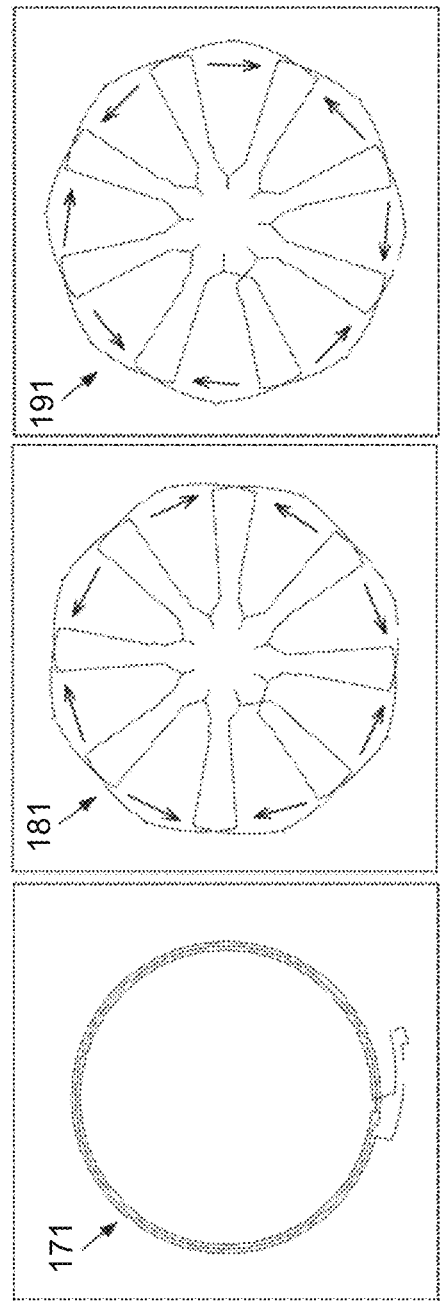

ROTARY POSITION SENSING APPARATUS AND METHOD

PRIORITY CLAIM

The present application is Continuation of U.S. application Ser. No. 17/048,149, having a filing date of Oct. 16, 2020, which is a National Stage Application, filed under 35 U.S.C. 371, of International Patent Application No. PCT/GB2018/051453, filed on May 29, 2018, titled "Rotary Position Sensing Apparatus and Method," the entirety of which are incorporated by reference herein.

TECHNICAL FIELD

Example aspects of the present disclosure relate to inductive sensing of the relative rotary position between two members.

BACKGROUND

Various forms of inductive position sensor are known for detecting the position of a first member relative to a second member. In some instances, one member carries a transmit aerial and a receive aerial while the other member carries an intermediate coupling element. The transmit aerial and the receive aerial are arranged so that, in the absence of the intermediate coupling element, a magnetic field generated by alternating current flowing through the transmit aerial induces a null signal in the receive aerial (the transmit aerial and the receive aerial are then referred to as balanced). However, in the presence of the intermediate coupling element, a magnetic field generated by alternating current flowing through the transmit aerial induces an electromotive force in the receive aerial that generates a current that is dependent on the position of the intermediate coupling element relative to the transmit and receive aerials. By analysing this current, the relative position of the two members can be determined.

SUMMARY

According to a first aspect, there is provided a rotary position sensor comprising a first member and a second member, one of the first and second members having a transmit aerial and a receive aerial and the other of the first and second members having an intermediate coupling element. The transmit aerial has at least one transmit conductive winding arranged so that current flowing through the transmit conductive winding generates a magnetic field, and the receive aerial has at least one receive conductive winding arranged to form a first set of current loops and a second set of current loops arranged so that current flowing in the receive conductive winding flows in a first rotational sense in the first set of current loops and in a second rotational sense opposing the first rotational sense in the second set of current loops. The intermediate coupling element comprises a conductive material arranged in a pattern such that the net electromotive force induced in the conductive winding of the receive aerial by the magnetic field generated by the transmit aerial varies in dependence on the relative rotary position of the first and second members. The pattern of the intermediate coupling element and the layout of the first set of current loops and the second set of current loops are mutually arranged such that any electromotive force induced in the first set of current loops by an alternating background magnetic field is substantially balanced by an electromotive force induced in the second set of current loops by the alternating background magnetic field, independent of the relative rotary position of the first and second members.

Further aspects are set out in the accompanying claims.

Further features and advantages of the present disclosure will become apparent from the following description of preferred embodiments, given by way of example only, which is made with reference to the accompanying drawings.

BRIEF DESCRIPTION OF THE DRAWINGS

FIG. 16A shows the layout of a conductive winding forming the transmit aerial of the rotary position sensor according to the fourth example;

FIG. 16B shows the layout of a conductive winding forming a sine winding of the receive aerial of the rotary position sensor according to the fourth example;

FIG. 16C shows the layout of a conductive winding forming a cosine winding of the receive aerial of the rotary position sensor according to the fourth example;

DETAILED DESCRIPTION

Figure 1:
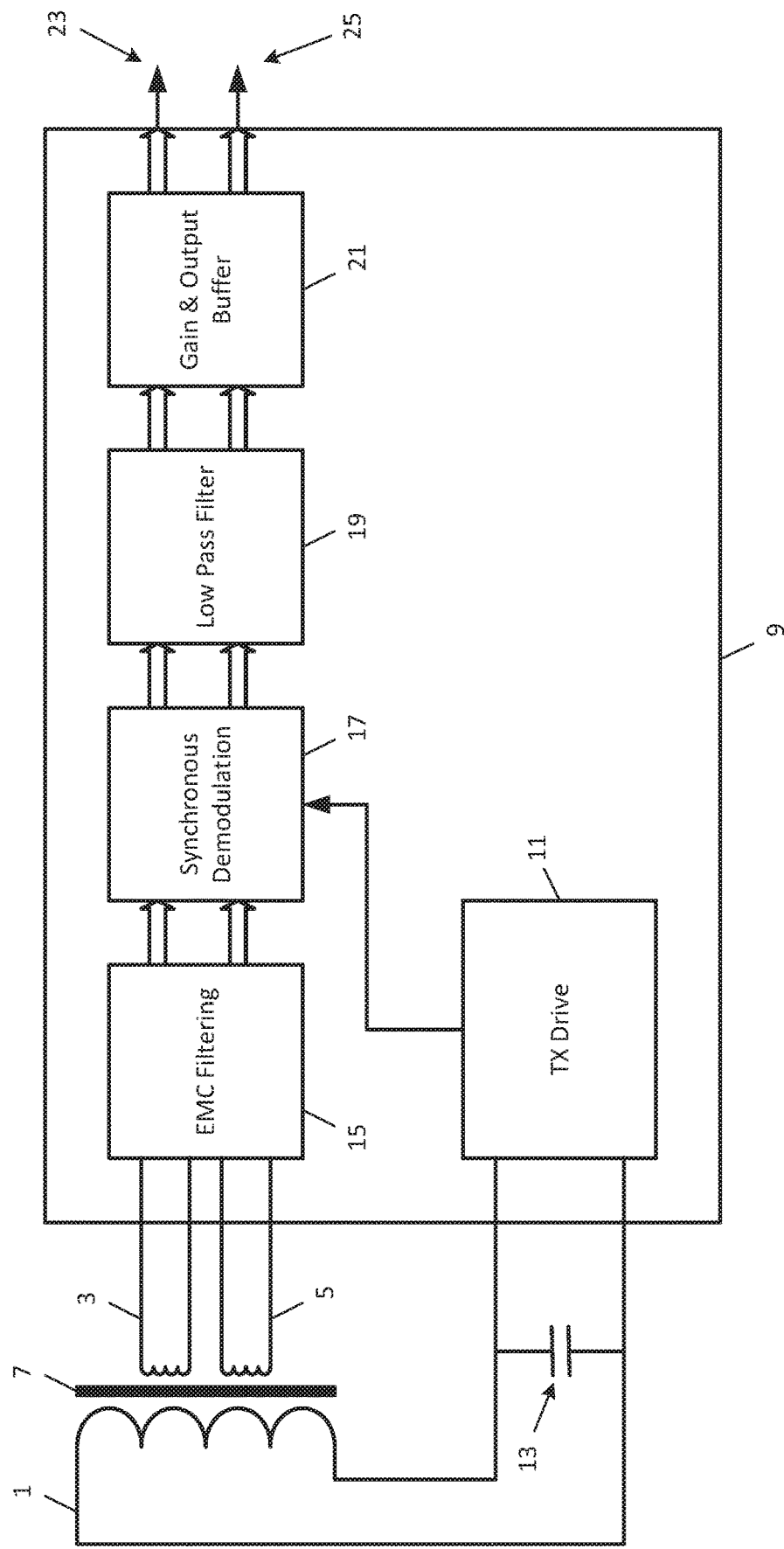
FIG. 1 shows the main components of a rotary position sensor.

A rotary position sensor according to example embodiments of the present disclosure will now be described with reference to FIGS. 1 to 6. As schematically shown in FIG. 1, in this example the rotary position sensor has a transmit aerial 1, a receive aerial formed by a sine winding 3 and a cosine winding 5, and an intermediate coupling element 7. The transmit aerial 1 and the receive aerial are formed on a first member (not shown) and the intermediate coupling element 7 is formed on a second member (also not shown) in such a manner that relative rotary movement between the first member and the second member causes a corresponding relative rotary movement between, on the one hand, the transmit aerial 1 and the receive aerial, and on the other hand, the intermediate coupling element.

The transmit aerial 1, the sine winding 3 and the cosine winding 5 are each formed by a respective conductive winding, with the ends of each conductive winding electrically connected to respective terminals of processing circuitry 9. In this example the processing circuitry 9 is in the form of a semiconductor integrated circuit device, such as an Application Specific Integrated Circuit (ASIC) or an Application Specific Standard Product (ASSP). In other examples, the processing circuitry 9 could alternatively utilise multiple interconnected devices and/or can be implemented using one or more suitable components (e.g., electronic components, such as discrete electronic components).

As shown in FIG. 1, the processing circuitry 9 includes a TX drive stage 11 which generates an oscillating electrical signal for supply to the transmit aerial 1. In this example, the TX drive stage 11 is a free running oscillator that generates an oscillating electrical signal at a drive frequency determined by the inductance of the transmit aerial 1 and the capacitance of a capacitor 13 connected in parallel to the transmit aerial 1. This drive frequency is normally selected to be a few MHz, for example in the range of about 1 MHz to about 6 MHz. As used herein, the use of the term "about" in conjunction with a numerical value is intended to refer to within 20% of the stated numerical value.

Supplying an oscillating current to the transmit aerial 3 induces electromotive forces in the sine winding 3 and the cosine winding 5, which cause current to flow in the sine winding 3 and the cosine winding 5. As shown in FIG. 1, the sine winding 3 and the cosine winding 5 are separate windings such that separate currents flow in the sine winding 3 and the cosine winding 5. The sine winding 3 and the cosine winding 5 are electrically connected to separate terminals of the processing circuitry 9, with the current flowing in the sine winding 3 being processed to provide a sine output signal 23 and the current flowing in the cosine winding 5 being processed to provide a cosine output signal 25. The relative magnitudes of the sine output signal 23 and the cosine output signal 25 are indicative of the relative rotary position of the first member and the second member.

On entering the processing circuitry 9, current flowing in the sine winding 3 first goes through an EMC filtering stage 15, to reduce signal components at frequencies away from the drive frequency. The filtered out signal components may be caused, for example, by interference from electrical signals generated by other nearby electrical components.

The filtered electrical signal then goes through a synchronous demodulation stage 17 in which the filtered electrical signal is mixed with a demodulation signal from the TX drive stage 11. The demodulation signal is in phase with the drive signal and, as a result of the intermediate coupling element 7 being formed of a conductive material, the electrical signal from the sine winding 3 is 180° out of phase with the drive signal. The demodulated electrical signal resulting from the synchronous demodulation accordingly has a baseband component whose magnitude varies in dependence on the relative rotary position of the first and second members and higher frequency components at twice the drive frequency and at higher harmonics of the drive frequency.

The demodulated electrical signal then passes through a low pass filtering stage 19 to remove the high frequency components corresponding to harmonics of the drive signal, leaving the baseband component, and then passes through gain and output buffer stage 21, which allows an adjustable gain to be applied before the sine output signal 23 is output by the processing circuitry 9.

As will be apparent from FIG. 1, current induced in the cosine winding 5 also undergoes EMC filtering 15, synchronous demodulation 17, low pass filtering 19 and gain and output buffering 21 within the processing circuitry 9, before being output as the cosine output signal 25.

The transmit aerial 1, the sine winding 3 and the cosine winding 5 are formed by conductive tracks arranged on the first member, while the intermediate coupling element 7 is formed by a pattern 31 of conductive material arranged on the second member.

Figure 2:
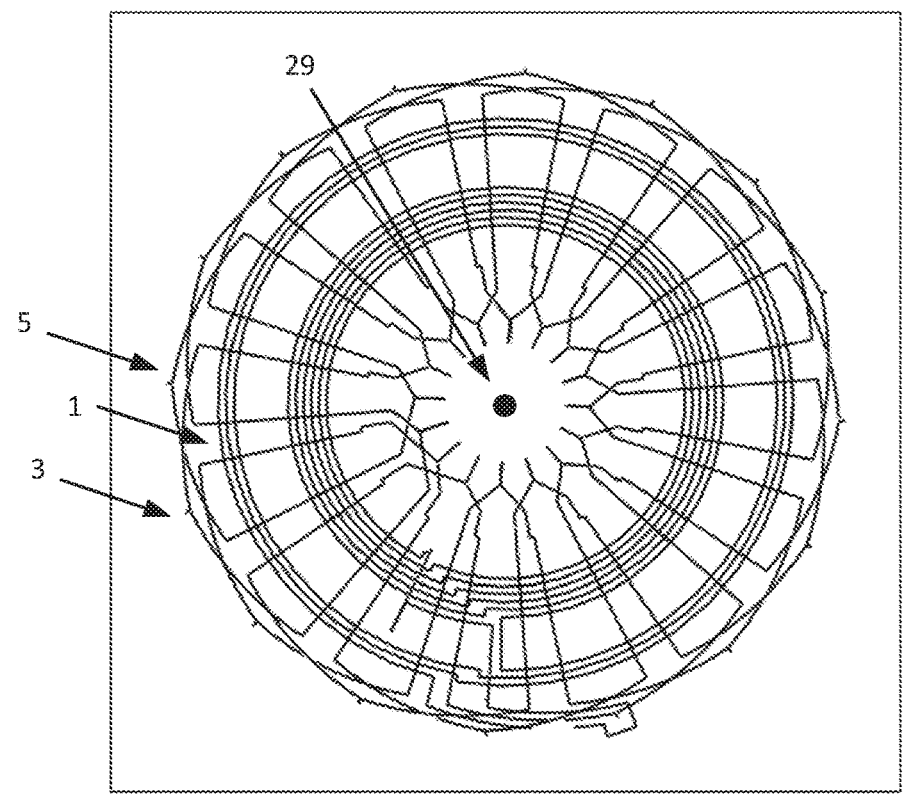
FIG. 2 shows a plan view of the layout of a transmit aerial and a receive aerial on a first member of the rotary position sensor according to a first example.
Figure 3:
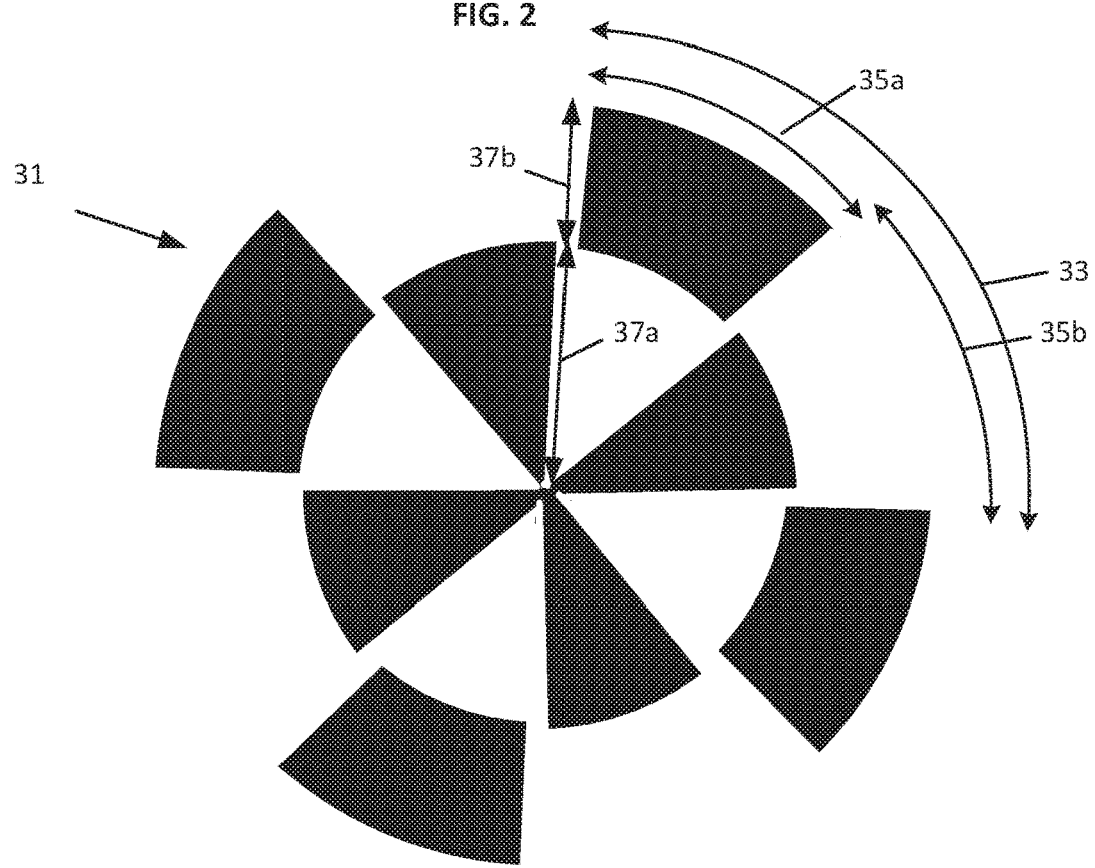
FIG. 3 shows a plan view of a conductive pattern forming an intermediate coupling element on a second member of the rotary position sensor according to the first example.
Figure 4:
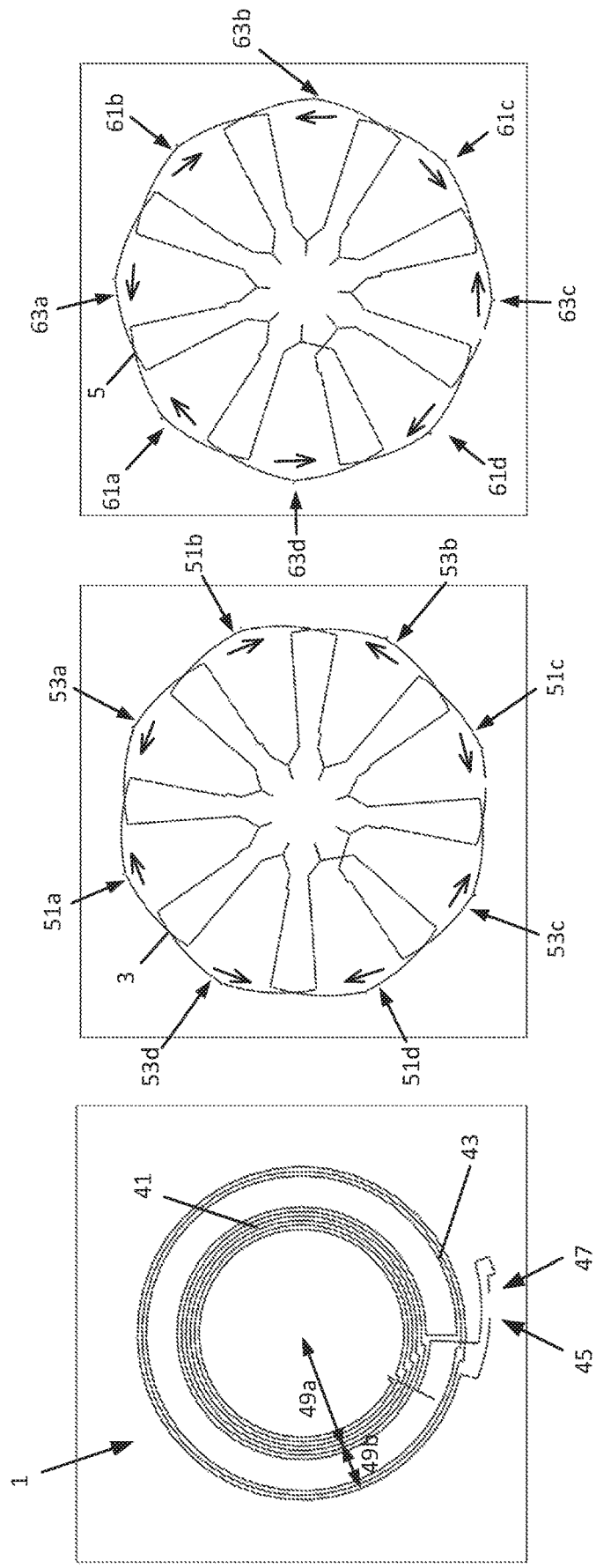
FIG. 4A shows the layout of a conductive winding forming the transmit aerial of the rotary position sensor according to the first example.
FIG. 4B shows the layout of a conductive winding forming a sine winding of the receive aerial of the rotary position sensor according to the first example.
FIG. 4C shows the layout of a conductive winding forming a cosine winding of the receive aerial of the rotary position sensor according to the first example.

In this example, FIG. 2 shows the layout of conductive tracks on the first member and FIG. 3 shows the pattern 31 of conductive material on the second member. For ease of explanation, FIGS. 4A, 4B and 4C respectively show individually the conductive track forming the transmit aerial 1, the conductive track forming the sine winding 3 and the conductive track forming the cosine winding 5. It can be seen from FIG. 2 that the conductive tracks form generally rotationally symmetric patterns centred on the axis of rotation 29 of the first member.

As can be seen in FIG. 4A, the conductive track forming the transmit aerial 1 has an inner set of loops 41 encircling a central portion extending a first radial extent 49a from the axis of rotation 29, and an outer set of loops 43 encircling the inner set of loops 41 such that an annulus is formed between the inner set of loops 41 and the outer set of loops 43 over a second radial extent 49b. From the viewpoint of FIG. 4A, drive current supplied to the conductive track at terminal 45 flows in one rotational sense (e.g. clockwise) around the outer set of loops 43 and in the opposing rotational sense (e.g. counter-clockwise) around the inner set of loops 41. The drive current then flows to terminal 47 (it will be appreciated that the radial portion of conductive track crossing the inner set of loops 41 and the radial portion of conductive track crossing the outer set of loops are respectively electrically insulated from the inner set of loops 41 and the outer set of loops 43). By supplying an oscillating electrical signal to the transmit aerial 1, a magnetic field is generated having field components of one polarity through the annulus between the inner set of loops 41 and the outer set of loops 43, and of the opposite polarity through the central portion encircled by the inner set of loops 41.

As shown in FIG. 4B, the sine winding 3 forms two set of current loops. Current flowing in one rotational sense (e.g. clockwise) in the first set of current loops 51a-51d flows in the other rotational sense (e.g. counter-clockwise) in the second set of current loops. The current loops 51 of the first set are angularly interdigitated with the current loops 53 of the second set in a symmetrical manner. Accordingly, proceeding in a rotational direction the layout of the conductive winding forming the sine winding 3 periodically repeats, with each period including a loop 51 of the first set and a loop 53 of the second set. In this example, there are four periods although other numbers of periods could be used.

In a similar manner, as shown in FIG. 4C, the cosine winding forms two set of current loops, with current flowing in one rotational sense (e.g. clockwise) in the current loops 61a-61d of the first set and the opposing rotational sense (e.g. counter-clockwise) in the current loops 63a-63d of the second current set. The current loops 61 of the first set are angularly interdigitated with the current loops 63 of the second set in a symmetrical manner. Accordingly, proceeding in a rotational direction the layout of the conductive winding forming the cosine winding 5 periodically repeats, with each period including a loop 61 of the first set and a loop 63 of the second set. The cosine winding 5 has the same number of windings as the sine winding 3, but is angularly offset with respect to the sine winding 3 by a quarter of a period.

Figure 5:
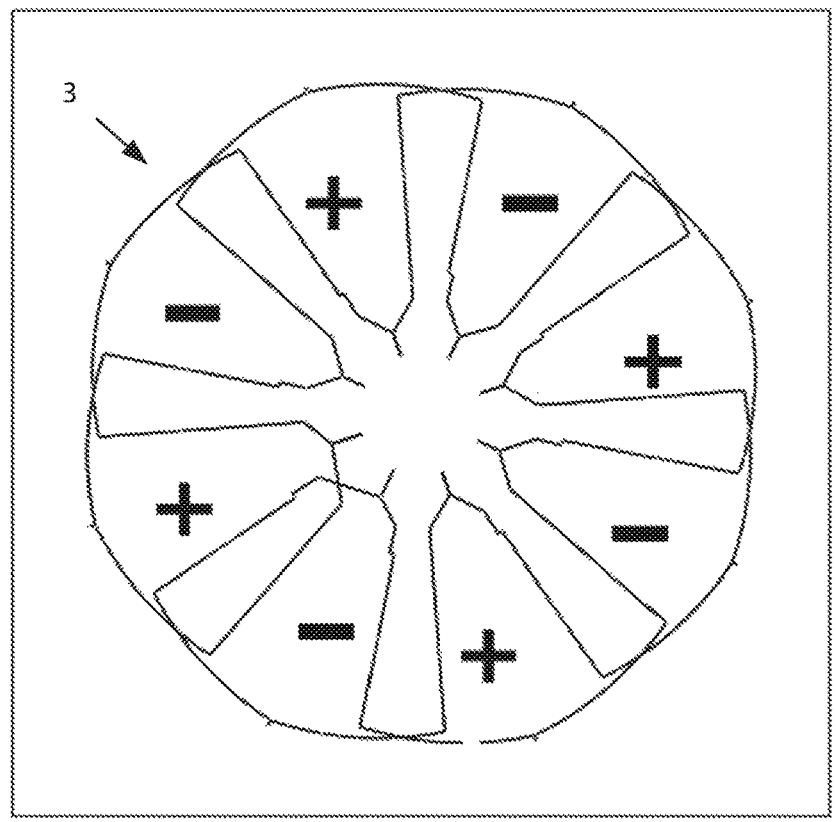
FIG. 5 schematically shows electromotive forces generated in the sine winding illustrated in FIG. 4B by an alternating background magnetic field in the absence of the intermediate coupling element illustrated in FIG. 3.

In the absence of the intermediate coupling element 7, the electromotive forces directly induced in the sine winding 3 by the magnetic field generated by the transmit aerial 1 balance each other out such that no current flows in the sine winding 3 directly as a result of the magnetic field generated by the transmit aerial 1. Further, as schematically illustrated in FIG. 5, in the absence of the intermediate coupling element 7, electromotive forces induced in the sine winding 3 by any alternating background magnetic fields that are substantially uniform over the extent of the sine winding 3 substantially balance each other, resulting in substantially no associated current flow. In a similar manner, in the absence of the intermediate coupling element 7, the electromotive forces directly induced in the cosine winding 5 by the magnetic field generated by the transmit aerial 1 balance each other out such that no current flows in the cosine winding 5 directly as a result of the magnetic field generated by the transmit aerial 1, and similarly electromotive forces induced in the cosine winding 5 by any background alternating magnetic fields that are substantially uniform over the extent of the cosine winding 5 substantially balance each other, resulting in substantially no associated current flow.

As shown in FIG. 3, the pattern 31 of conductive material forming the intermediate coupling element also periodically repeats in a rotational direction, with the same number of periods (in this example four) as the sine winding 3 and the cosine winding 5. Each period corresponds to a sector 33 of a circle, and is formed by two adjacent, non-overlapping, sub-sectors 35a,35b. In the first subsector 35a, conductive material is absent over a first radial extent 37a extending from the centre of the pattern to a first radial position while conductive material is present over a second radial extent 37b extending from the first radial position to a second radial position. On the second subsector 35b, conductive material is present over the first radial extent 37a while conductive material is absent over the second radial extent 37b so that the sub-patterns in the first and second sub-sectors 35a, 35b are complementary. At the boundary of the first radial extent 37a and the second radial extent 37b, a gap is provided between the conductive material in the first sub-sector 37a and the second sub-sector 37b to avoid unwanted current loops being formed.

Figure 6:
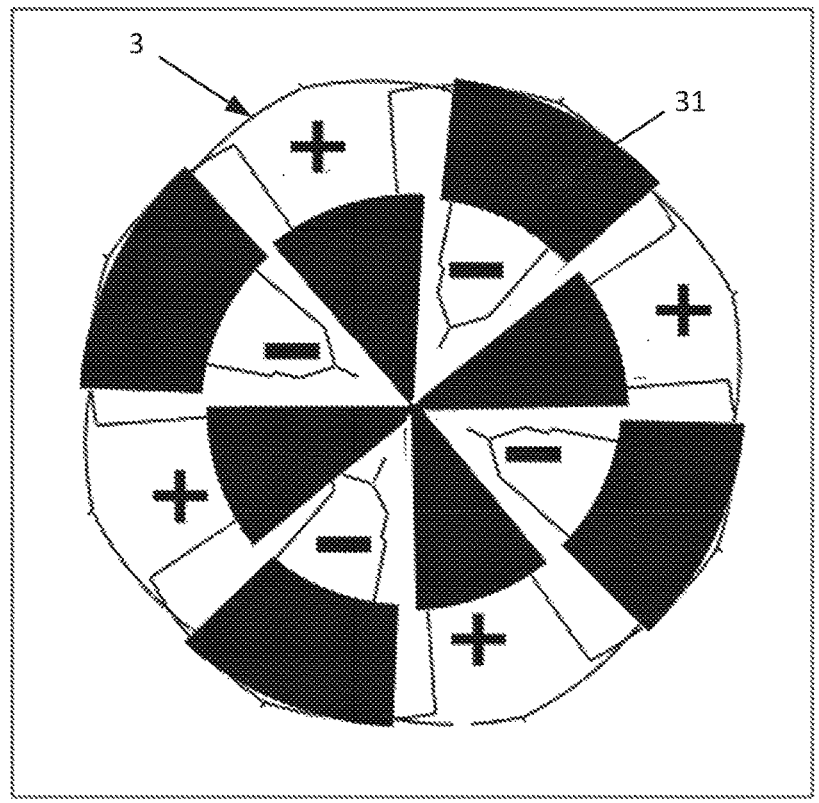
FIG. 6 schematically shows electromotive forces generated in the sine winding illustrated in FIG. 4B by an alternating background magnetic field in the presence of the intermediate coupling element illustrated in FIG. 3.

FIG. 6 shows the conductive pattern 31 of the intermediate coupling element 7 superposed over the sine winding 3 in one relative rotational position of the first and second members. With regard to the magnetic field generated by the transmit aerial 1, over the first radial extent 37a of the conductive pattern 31 coupling occurs into current loops 51 of the first set of current loops whereas over the second radial extent 37b of the conductive pattern 31 coupling occurs into the second set of current loops. However, given that the polarity of the magnetic field generated by the transmit aerial 1 over the first radial extent 37a is opposite to the polarity of the magnetic field generated by the transmit aerial 1 over the second radial extent 37b, the induced electromotive forces act together to generate a current in the sine winding 3. The magnitude of the current induced in the sine winding 3 as a result of the magnetic field generated by the transmit aerial 1 will vary in dependence on the relative rotational position of the first and second members according to a first sinusoidal function. Similarly, the magnitude of the current induced in the cosine winding 5 as a result of the magnetic field generated by the transmit aerial 1 will vary in dependence on the relative rotational position of the first and second members according to a second sinusoidal function that is 90° out of phase with the first sinusoidal function.

With regard to any alternating background magnetic field, the conductive material of the intermediate coupling element 7 shields adjacent portions of the receive aerial. However, the pattern 31 of the intermediate coupling element 7 and the layout of the first set of current loops 51 and the second set of current loops 53 of the sine winding 3 are mutually arranged such that any electromotive force induced in the first set of current loops 51 by the remaining background alternating magnetic field is substantially balanced by electromotive force induced in the second set of current loops 53 by the background alternating magnetic field. This applies independent of the relative rotary position of the first and second members. For components of any background magnetic field at frequencies close to the drive frequency, which would not be filtered out by the EMC filtering and the synchronous demodulation, this removes a possible noise component from the signal corresponding to the current induced by the field generated by the transmit aerial 1, thereby improving the signal to noise ratio.

The example described with reference to FIGS. 1 to 6 differs from conventional designs with respect to the pattern of the conductive material 31 forming the intermediate coupling element 7 and the layout of the conductive track of the transmit aerial 1. As discussed above, the differences can achieve a number of technical effects and benefits. For instance, the differences can achieve a balancing of electromagnetic forces induced in the sine winding 3 and the cosine winding 5 by a uniform alternating background magnetic field irrespective of the relative rotary position between the first member and the second member. Another rotary position sensor according to example embodiments of the present disclosure will now be described with reference to FIGS. 7 to 9 in which the rotary sensor differs from conventional designs with respect to the layout of the transmit aerial and the receive aerial in order to achieve the same effect.

Figure 7:
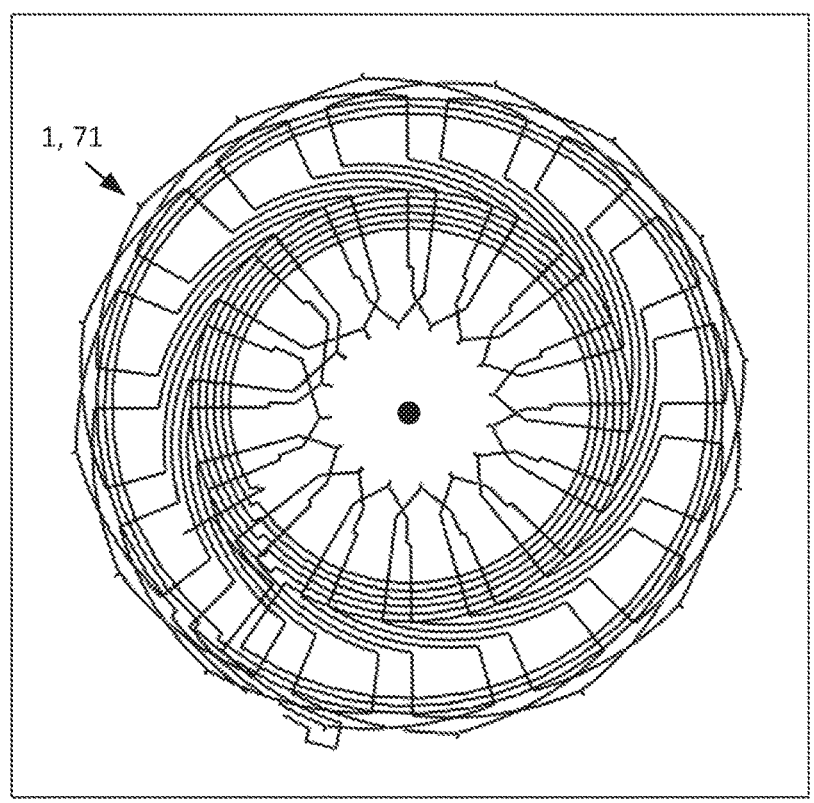
FIG. 7 shows a plan view of the layout of a transmit aerial and a receive aerial on a first member of the rotary position sensor according to a second example.
Figure 8:
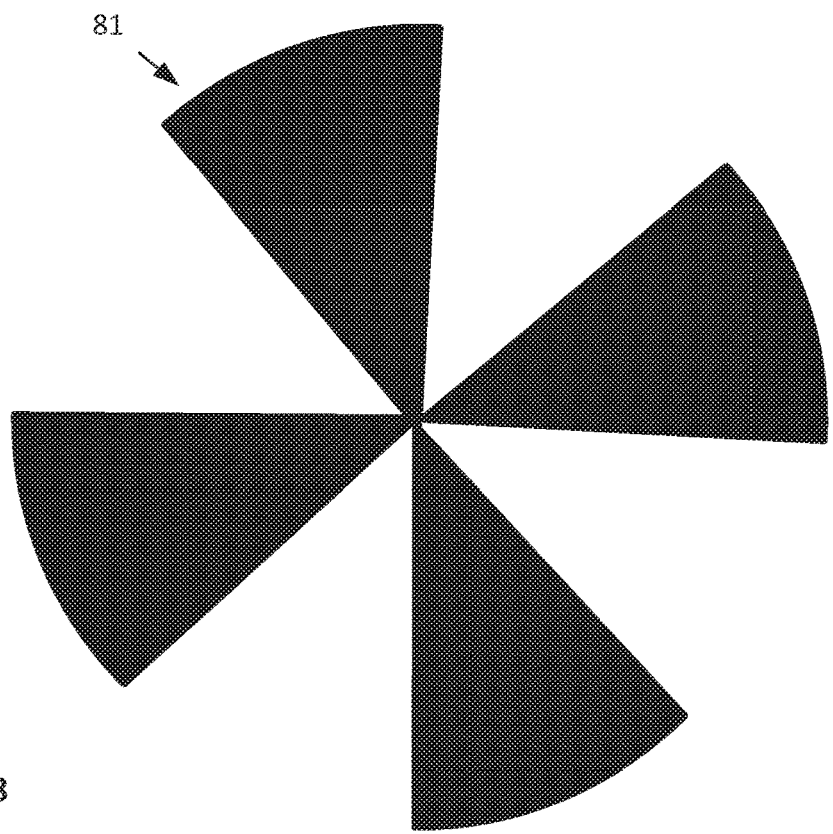
FIG. 8 shows a plan view of a conductive pattern forming an intermediate coupling element on a second member of the rotary position sensor according to the second example.
Figure 9:
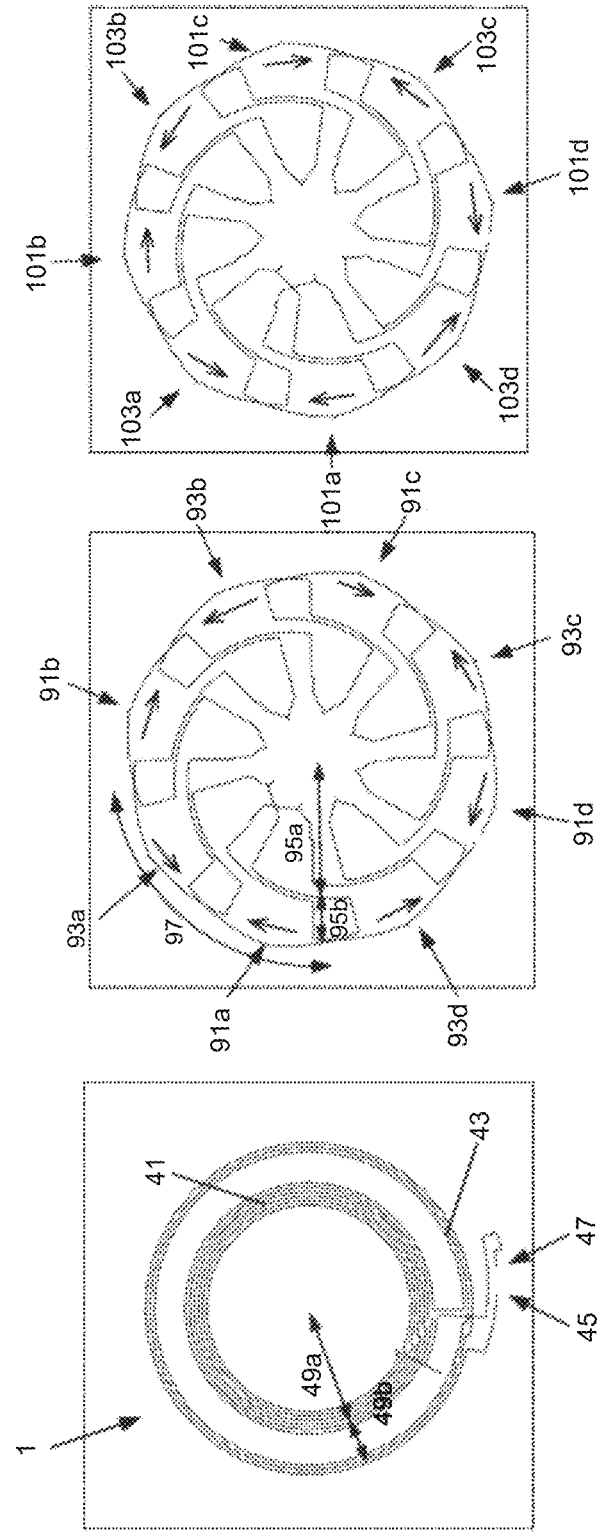
FIG. 9A shows the layout of a conductive winding forming the transmit aerial of the rotary position sensor according to the second example.
FIG. 9B shows the layout of a conductive winding forming a sine winding of the receive aerial of the rotary position sensor according to the second example.
FIG. 9C shows the layout of a conductive winding forming a cosine winding of the receive aerial of the rotary position sensor according to the second example.

In this example, FIG. 7 shows the layout of conductive tracks forming the transmit aerial 1 and the receive aerial 71 on the first member and FIG. 8 shows the pattern 81 of conductive material on the second member. For ease of explanation, FIGS. 9A, 9B and 9C respectively show individually the conductive track forming the transmit aerial 1, the conductive track forming the sine winding 3 and the conductive track forming the cosine winding 5. It can be seen from FIG. 7 that the conductive tracks of the transmit aerial 1 and receive aerial are generally rotationally symmetric about the axis of rotation 29 of the first member.

As can be seen in FIG. 9A, the conductive track forming the transmit aerial 1 has essentially the same layout as the conductive track forming the transmit aerial of the previous example, as illustrated in FIG. 4A, and accordingly the same reference numerals have been used to reference the same features. In particular, the conductive track has an inner set of loops 41 encircling a central portion extending a first radial extent 49a from the axis of rotation 29, and an outer set of loops 43 encircling the inner set of loops 41 such that an annulus is formed between the inner set of loops 41 and the outer set of loops 43 over a second radial extent 49b. From the viewpoint of FIG. 9A, drive current supplied to the conductive track at terminal 45 flows in one rotational sense (e.g. clockwise) around the outer set of loops 43 and in the opposing rotational sense (e.g. counter-clockwise) around the inner set of loops 41. The drive current then flows to terminal 47 (it will be appreciated that the radial portion of conductive track crossing the inner set of loops 41 and the radial portion of conductive track crossing the outer set of loops are respectively electrically insulated from the inner set of loops 41 and the outer set of loops 43). By supplying an oscillating electrical signal to the transmit aerial 1, a magnetic field is generated having field components of one polarity through the annulus between the inner set of loops 41 and the outer set of loops 43, and of the opposite polarity through the central portion encircled by the inner set of loops 41.

As shown in FIG. 9B, the sine winding of the receive aerial 71 forms two set of current loops. In the first set of current loops 91a-91d, current flows in one rotational sense (e.g. clockwise) while in the second set of current loops 53a-53d current flows in the other rotational sense (e.g. counter-clockwise). The current loops 91, 93 are each formed of a first sub-loop within a first radial extent 95a and a second sub-loop within a second radial extent, extending beyond the first radial extent in a non-overlapping manner, with the first sub-loop being angularly offset from the second sub-loop. The current loops 91 of the first set are angularly interdigitated with the current loops 93 of the second set in a symmetrical manner. Accordingly, proceeding in a rotational direction the layout of the conductive winding forming the sine winding 3 periodically repeats over sectors of a circle, with a sector 97 comprising a first sub-sector angularly adjacent a second sub-sector, wherein the first sub-sector comprises within a first radial extent 95a a sub-loop of one of the first set of current loops 91 and within a second radial extent 95b a sub-loop of one of the second set of current loops 93, and wherein the second sub-sector comprises within the first radial extent 95a a sub-loop of one of the second set of current loops 93 and within the second radial extent 95b a sub-loop of one of the first set of current loops 91. In this example, there are four periods although other numbers of periods could be used.

In a similar manner, as shown in FIG. 9C, the cosine winding forms two set of current loops, with current flowing in one rotational sense (e.g. clockwise) in the current loops 101a-101d of the first set and the opposing rotational sense (e.g. counter-clockwise) in the current loops 103a-103d of the second current set. The current loops 101 of the first set are angularly interdigitated with the current loops 103 of the second set in a symmetrical manner in the same manner as for the sine winding illustrated in FIG. 9B, but is angularly offset with respect to the sine winding by a quarter of a period.

Figure 10:
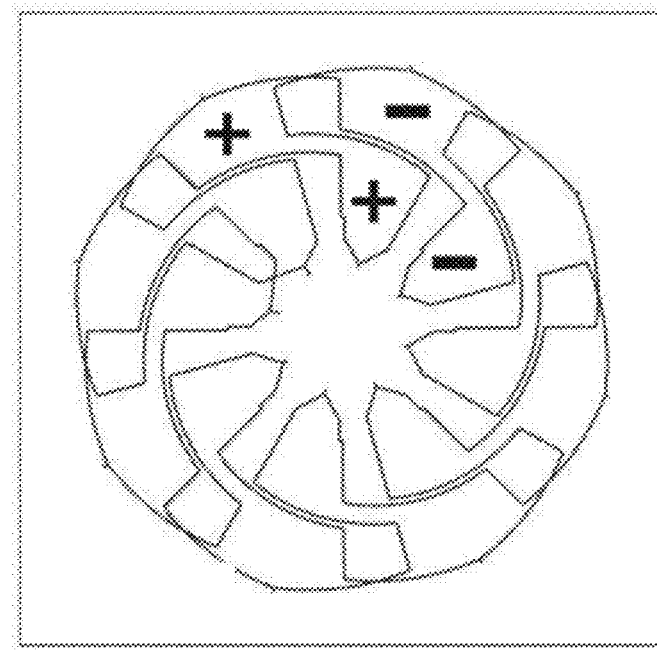
FIG. 10 schematically shows electromotive forces generated in the sine winding illustrated in FIG. 9B by an alternating background magnetic field in the absence of the intermediate coupling element illustrated in FIG. 8.

In the absence of the intermediate coupling element, the electromotive forces directly induced in the sine winding by the magnetic field generated by the transmit aerial 1 balance each other out such that no current flows in the sine winding 3 directly as a result of the magnetic field generated by the transmit aerial 1. Further, as schematically illustrated in FIG. 10, in the absence of the intermediate coupling element, electromotive forces induced in the sine winding by any background magnetic fields that are substantially uniform over the extent of the sine winding substantially balance each other, resulting in substantially no associated current flow. In a similar manner, in the absence of the intermediate coupling element, the electromotive forces directly induced in the cosine winding by the magnetic field generated by the transmit aerial 1 balance each other out such that no current flows in the cosine winding directly as a result of the magnetic field generated by the transmit aerial 1, and similarly electromotive forces induced in the cosine winding by any background magnetic fields that are substantially uniform over the extent of the cosine winding substantially balance each other, resulting in substantially no associated current flow.

As shown in FIG. 8, the pattern 81 of conductive material forming the intermediate coupling element also periodically repeats in a rotational direction, with the same number of periods (in this example four) as the sine winding and the cosine winding. Each period corresponds to a sector of a circle, and is formed by two adjacent, non-overlapping, sub-sectors. In the first subsector 35a, conductive material is absent, while in the second subsector 35b, conductive material is present. This corresponds to a conventional design for an intermediate coupling element.

Figure 11:
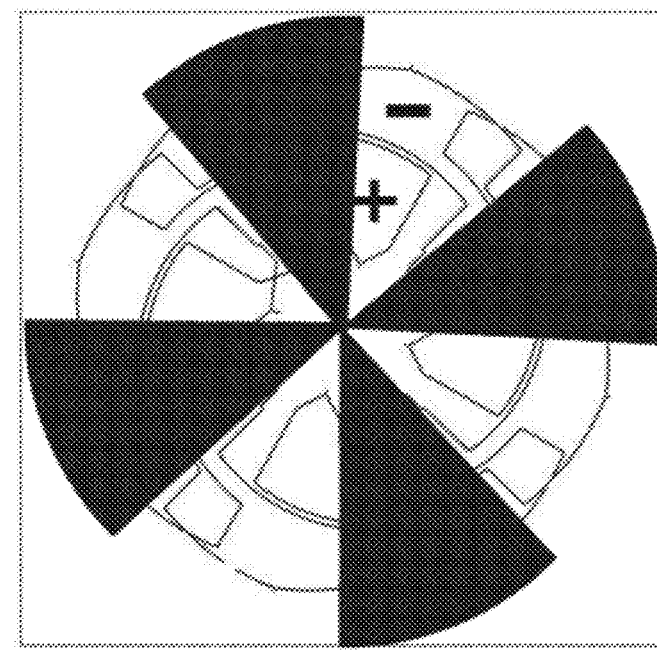
FIG. 11 schematically shows electromotive forces generated in the sine winding illustrated in FIG. 9B by an alternating background magnetic field in the presence of the intermediate coupling element illustrated in FIG. 8.

With regard to any alternating background magnetic field, the pattern 81 of the intermediate coupling element and the layout of the first set of current loops 91 and the second set of current loops 93 of the sine winding are mutually arranged such that, as shown in FIG. 11, any electromotive force induced in the first set of current loops 91 by a background alternating magnetic field is substantially balanced by electromotive force induced in the second set of current loops 93 by the background alternating magnetic field. This applies independent of the relative rotary position of the first and second members. For components of any background magnetic field at frequencies close to the drive frequency, which would not be filtered out by the EMC filtering and the synchronous demodulation, this removes a possible noise component from the signal corresponding to the current induced by the field generated by the transmit aerial 1, thereby improving the signal to noise ratio.

Figure 12:
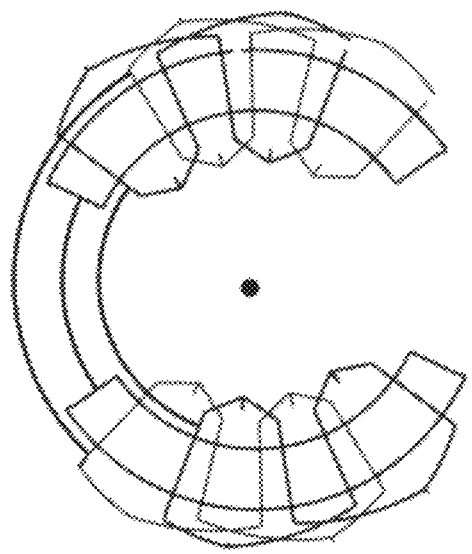
FIG. 12 shows a plan view of the layout of a transmit aerial and a receive aerial on a first member of the rotary position sensor according to a third example.
Figure 14:
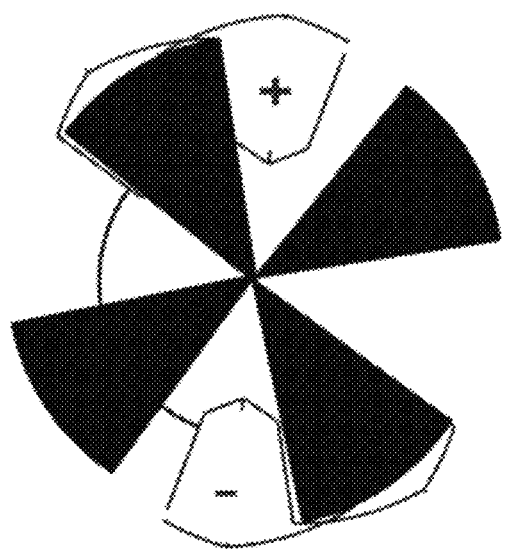
FIG. 14 schematically shows electromotive forces generated in the sine winding illustrated in FIG. 13B by an alternating background magnetic field in the presence of an intermediate coupling element matching that illustrated in FIG. 8.

In the examples described with reference to FIGS. 1 to 6 and FIGS. 7 to 11, the transmit aerial and receive aerial extend through 360°, and therefore data indicative of the relative position of the first and second members can be provided throughout a full range of rotational movement (it will be appreciated that the data provided may not indicate a unique position, but rather indicate one of a limited number of possible positions). In other rotary sensors, the relative movement of the first and second members may be restricted within an angular range. For such arrangements, it is known to provide the transmit aerial and the receive aerial only over a sector of the first member in accordance with the range of angular movement. Conventional arrangement can suffer, however, from the problem of noise caused by background alternating magnetic fields. FIGS. 12 to 14 depict a rotary position according to example embodiments of the present disclosure that employ layouts of transmit aerial and receive aerial to reduce such noise for a rotary position sensor having a restricted angular range of movement.

FIG. 12 shows the layout of the conductive windings forming the transmit aerial and the receive aerial on the first member. For ease of explanation, FIG. 13A to FIG. 13C respectively show the conductive track 131 forming the transmit aerial, the conductive track 141 forming the sine winding of the receive aerial, and the conductive track 151 forming the cosine winding of the receive aerial.

Figure 13C:
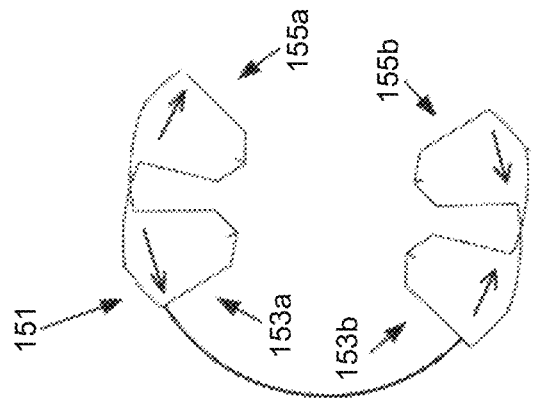
FIG. 13C shows the layout of a conductive winding forming a cosine winding of the receive aerial of the rotary position sensor according to the third example.
Figure 13B:
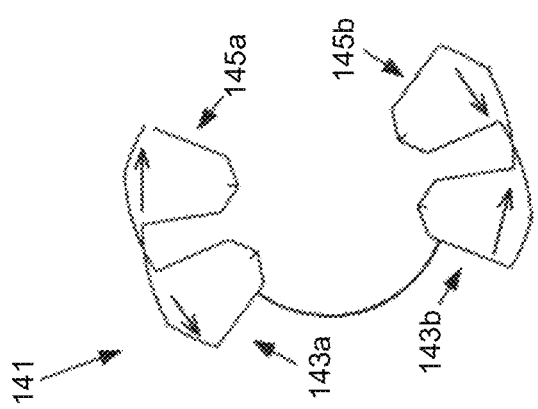
FIG. 13B shows the layout of a conductive winding forming a sine winding of the receive aerial of the rotary position sensor according to the third example.
Figure 13A:
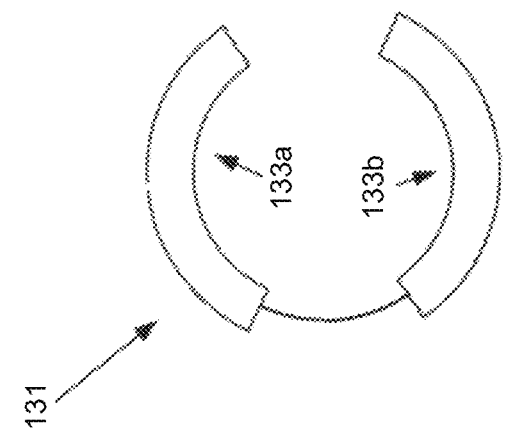
FIG. 13A shows the layout of a conductive winding forming the transmit aerial of the rotary position sensor according to the third example.

As shown in FIG. 13A, the conductive track 131 forming the transmit aerial has a first loop 133a generally aligned with a first minor arc of a circle centred on the axis of rotation and a second loop 133b diametrically opposed to the first loop and generally aligned with a second minor arc of the circle centred on the axis of rotation. At any one time, current flows through the first loop 133a and the second loop 133b in opposing rotational senses (i.e. clockwise through the first loop 133a and counter-clockwise through the second loop 133b from the perspective of FIG. 13A, or vice versa) so that an alternating current flowing through the conductive track 131 generates a magnetic field as a result of current flow though the first loop 133a that has a polarity opposite to the magnetic field generated as a result of current flow through the second loop 133b. It will be appreciated that the first loop 133a and the second loop 133b are joined by two separate conductive tracks which are insulated from each other but follow substantially the same path.

As shown in FIG. 13B, the conductive track 141 forming the sine winding of the receive aerial has a first set of current loops, including two current loops 143a, 143b, and a second set of current loops, including two current loops 145a, 145b. The conductive track 141 is wound such that a current flowing in the conductive track 141 would flow through the first set of current loops 143 in one rotational sense and the second set of current loops 145 in the opposite rotational sense. One current loop 143a of the first set of current loops and one current loop 145a of the second set of current loops are generally aligned with the first loop 133a of the conductive track 131 of the transmit aerial but angularly spaced from each other, and similarly the other current loop 143b of the first set of current loops and the other current loop 145b of the second set of current loops are generally aligned with the second loop 133b of the conductive track 131 of the transmit aerial but angularly spaced from each other. Each current loop 143 of the first set of current loops is diametrically opposed to a current loop 145 of the second set of current loops. It will be appreciated that the first loop 143a of the first set of current loops and the second loop 143b of the first set of current loops are joined by two separate conductive tracks which are insulated from each other but follow substantially the same path.

As shown in FIG. 13C, the layout conductive track 151 of the cosine winding of the receive aerial substantially corresponds to the layout of the conductive track of the sine winding rotated though a quarter of a period.

In this example, the pattern of the conductive material forming the intermediate coupling element is the same as that shown in FIG. 8, and will be referred to using the same reference numeral 81.

With regard to any alternating background magnetic field, the pattern 81 of the intermediate coupling element and the layout of the first set of current loops 143 and the second set of current loops 145 of the sine winding are mutually arranged such that, as shown in FIG. 14, any electromotive force induced in a current loop of the first set of current loops 143 by a background alternating magnetic field is substantially balanced by electromotive force induced in a current loop of the second set of current loops 145 by the background alternating magnetic field. This applies independent of the relative rotary position of the first and second members. For components of any background magnetic field at frequencies close to the drive frequency, which would not be filtered out by the EMC filtering and the synchronous demodulation, this removes a possible noise component from the signal corresponding to the current induced by the field generated by the transmit aerial 1, thereby improving the signal to noise ratio.

The previously-described embodiments have all involved use of a novel transmit aerial layout in combination with either a novel receive aerial layout or a novel conductive patter formed on the intermediate coupling element. An example will now be described with reference to FIGS. 15 to 17 that uses a novel conductive pattern on the intermediate coupling element.

Figure 15:
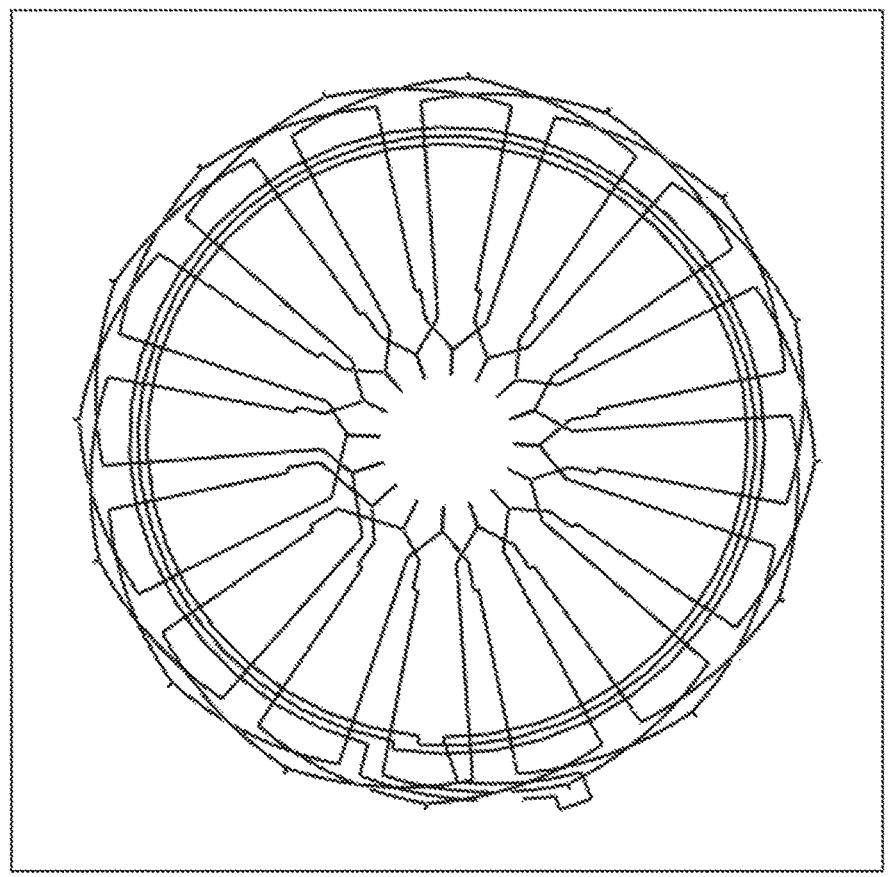
FIG. 15 shows a plan view of the layout of a transmit aerial and a receive aerial on a first member of the rotary position sensor according to a fourth example.

FIG. 15 shows the conductive tracks formed on the first member to form the transmit aerial and the receive aerial. For ease of explanation, the conductive track 171 forming the transmit aerial, the conductive track 181 forming the sine winding and the conductive track 191 forming the cosine winding are respectively shown separately in FIGS. 16A to 16B. As shown in FIG. 16A, the conductive track forming the transmit aerial is formed by a set of loops centred on the axis of rotation and having similar radius. As shown in FIGS. 16B and 16C, the conductive track 181 forming the sine winding for the receive aerial and the conductive track forming the cosine winding for the receive aerial are substantially the same as those respectively shown in FIGS. 4B and 4C.

Figure 17:
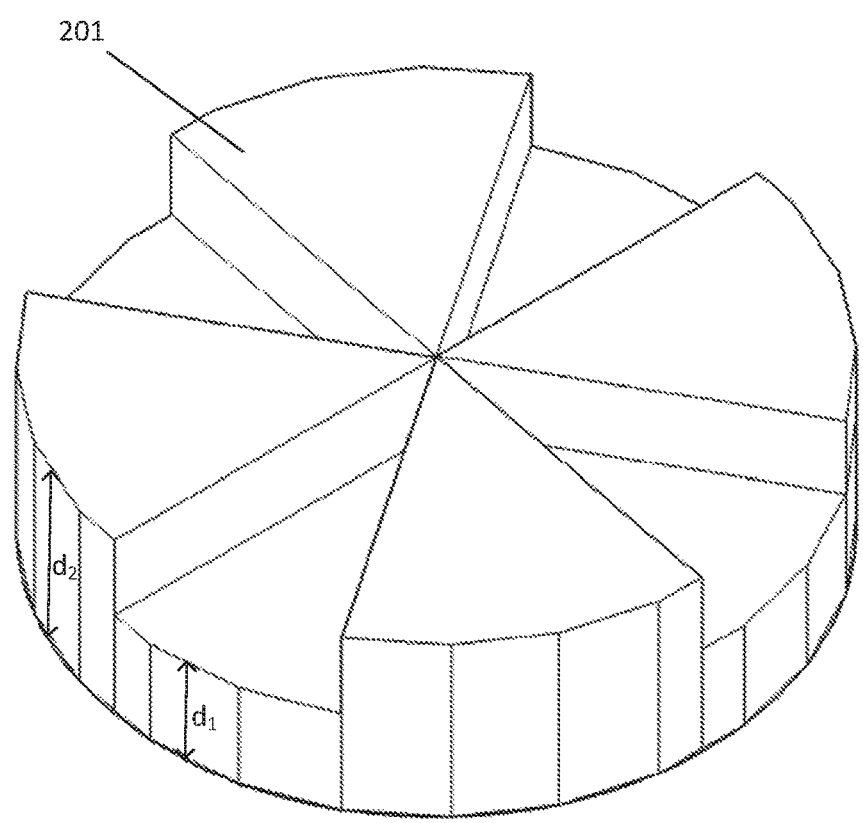
FIG. 17 shows an intermediate coupling element according to the fourth example.

In this example, as shown in FIG. 17, the conductive material 201 on the intermediate coupling element is in the form of a continuous pattern of varying thickness. In particular, in this example the conductive material 201 extends over the entire extent of the receive aerial, and has regions with a first thickness di and regions of a second thickness $d_2$. It will be seen by comparing FIG. 17 with FIG. 8 that the regions having the first thickness di in the intermediate coupling element of FIG. 17 substantially correspond to the regions in which conductive material is absent in FIG. 8 and the regions having the second thickness $d_2$ in the intermediate coupling element of FIG. 17 substantially correspond to the regions in which conductive material is present in FIG. 8. It will be appreciated by those skilled in the art that with respect to the magnetic field generated by alternating current flowing through the conductive track 171 of the transmit aerial, electromagnetic forces will be induced in the conductive tracks 181, 191 of the receive aerial in dependence on the relative rotary position of the first and second members by virtue of the pattern of conductive material 201 in the of the intermediate coupling element of FIG. 8. Further, the continuous extent of the conductive material 201 of the intermediate coupling element of FIG. 17 over the receive aerial will shield the receive aerial from alternating background magnetic fields, thereby reducing noise. In this example, the difference between the first thickness di and the second thickness $d_2$ is of the same order as about the width of the loops of the sine winding and the cosine winding, which results in a good signal strength.

Figure 18:
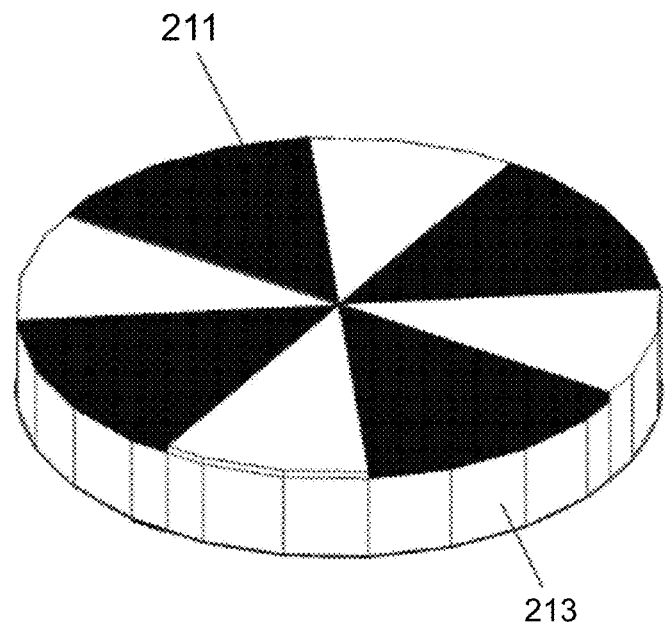
FIG. 18 shows an intermediate coupling element according to a fifth example.

In some embodiments, the intermediate coupling element of FIG. 17 could be replaced by the intermediate coupling element of FIG. 18 to increase signal strength. In this example, a thin layer of ferromagnetic material 211 is formed on a non-conductive substrate 213 (such as a printed circuit board) with a pattern matching the pattern of conductive material of the intermediate coupling element of FIG. 8. Given the thinness of the ferromagnetic material, an alternating background magnetic field will pass through the intermediate coupling element of FIG. 18 substantially unimpeded. Accordingly, any electromotive force induced in a current loop of the first set of current loops 141 by a background alternating magnetic field is substantially balanced by electromotive force induced in a current loop of the second set of current loops 143 by the background alternating magnetic field.

FIGS. 17 and 18 illustrate intermediate coupling elements in which the conductive material of the intermediate coupling element overlaps the entirety of the receive aerial, thereby shielding the receive aerial from any background alternating magnetic field. In some embodiments, the intermediate coupling element is formed by alternating sectors of conductive material and ferromagnetic material in the same pattern as shown in FIGS. 17 and 18. In such an arrangement, there will be a noise component in the current flowing in the sine winding and the cosine winding as the ferromagnetic material does not shield the receive aerial from background alternating magnetic field. However, the signal to noise ratio is still improved as the signal is increased due to both the conductive material and the ferromagnetic material contributing, in a cooperative manner given the difference in the phase shifts imparted by the conductive material and the ferromagnetic material, to the signal component of the current flowing in the sine winding and in the cosine winding.

Figure 19:
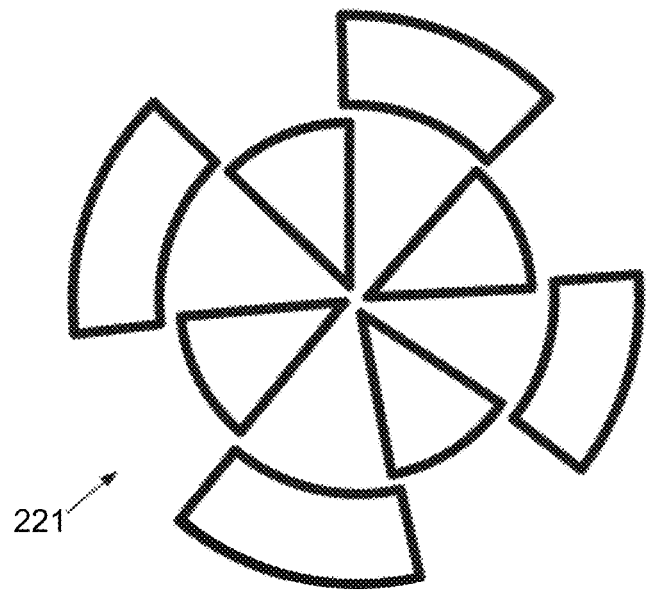
FIG. 19 shows an intermediate coupling element according to a sixth example.

While the intermediate coupling elements of FIGS. 3 and 8 have patterns formed by uniform extents of conductive material, this is not essential. As shown in FIG. 19, the pattern of FIG. 3 could be replaced by a pattern 221 in which each extent of conductive material is replaced by a conductive loop corresponding to the periphery of that extent. For the intermediate coupling element of FIG. 19, an alternating background magnetic field will induce electromotive forces that cause currents having the same directional sense to flow in each loop so as to generate a magnetic field opposing the background magnetic field. In this way, the intermediate coupling element of FIG. 19 provides a shielding effect with respect to a background alternating magnetic field in a similar way to the intermediate coupling element of FIG. 3. Accordingly, for embodiments utilising the intermediate coupling element of FIG. 3, the intermediate coupling element of FIG. 19 could alternatively be used.

Figure 20:
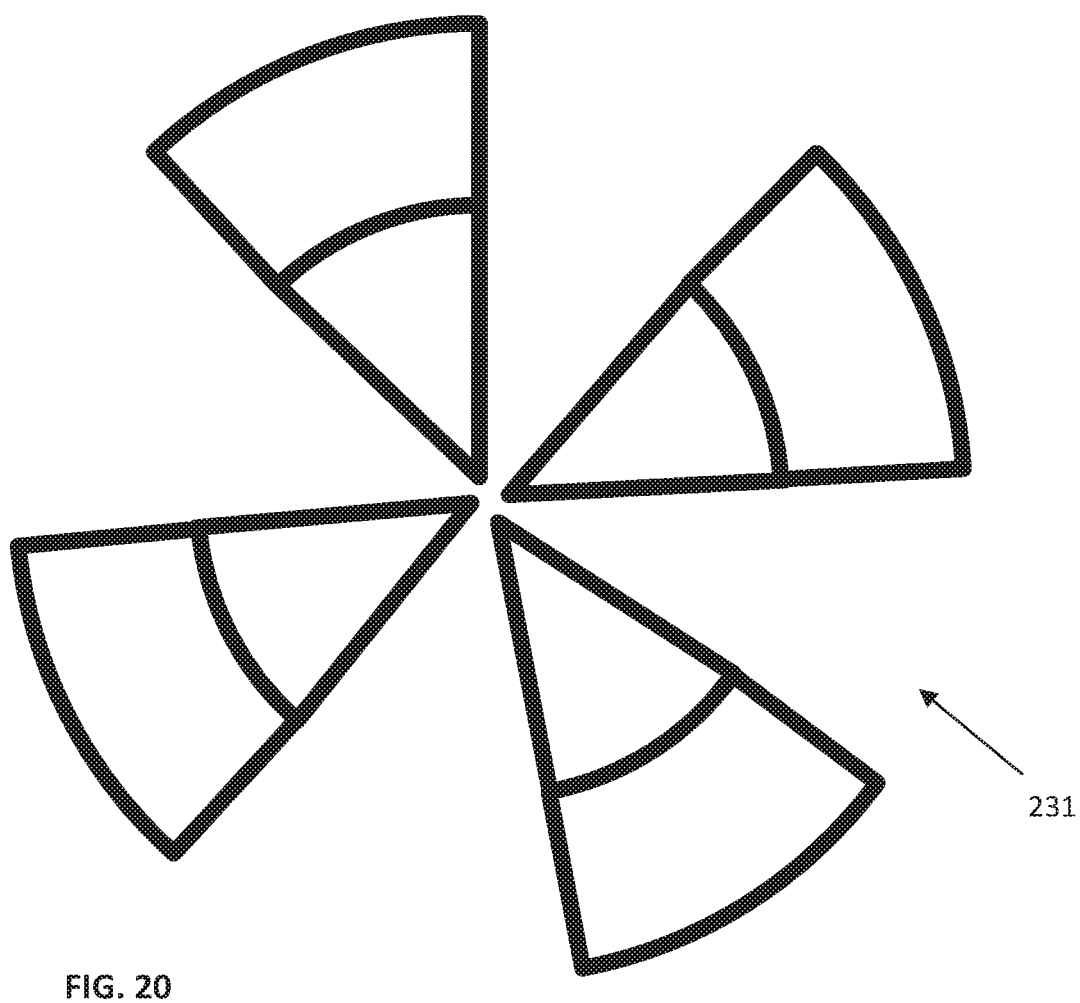
FIG. 20 shows an intermediate coupling element according to a seventh example.

In a similar way, FIG. 20 shows a pattern 231 of conductive track that could be used in place of the intermediate coupling element of FIG. 8.

Figure 21:
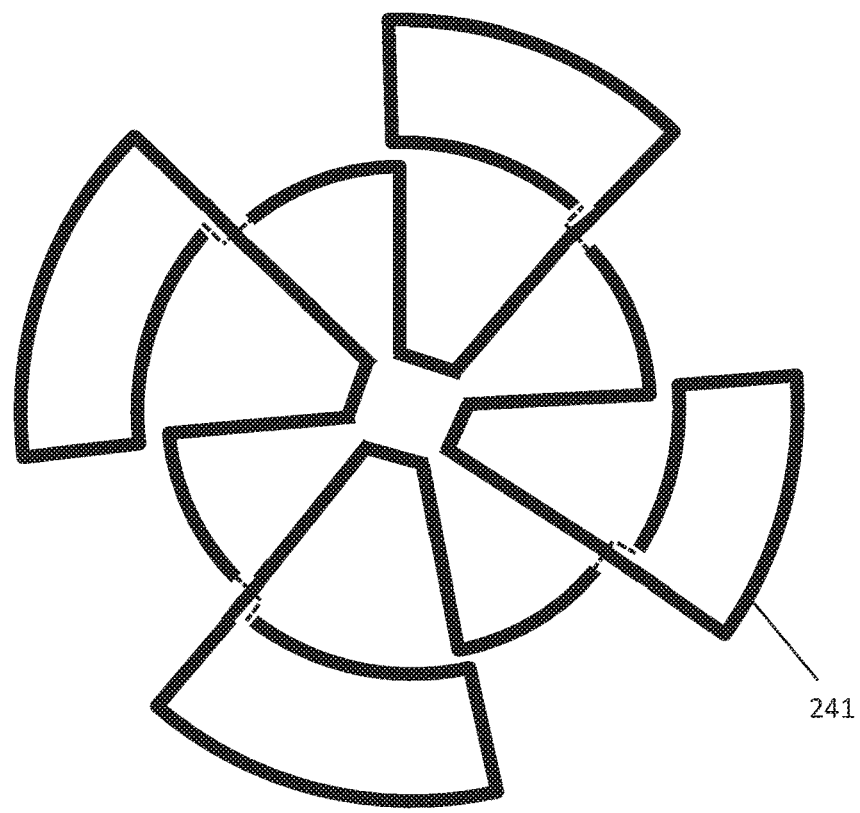
FIG. 21 shows an intermediate coupling element according to an eighth example.
Figure 22:
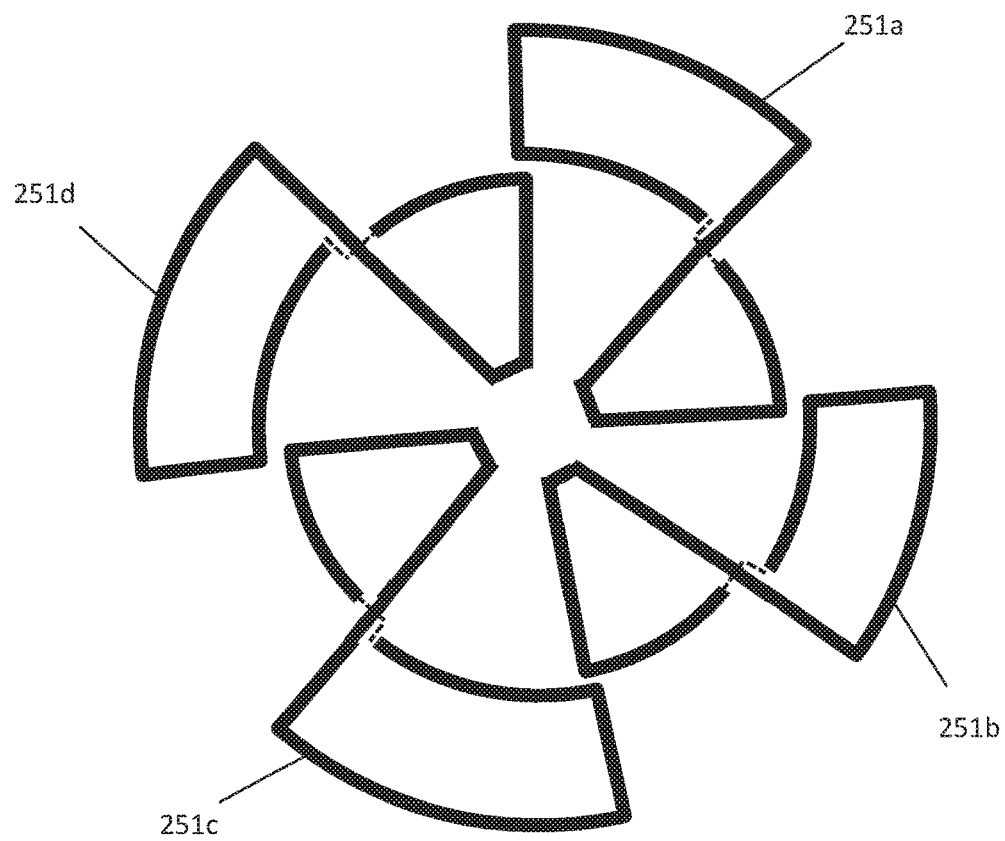
FIG. 22 depicts an intermediate coupling element according to an example.

The conductive tracks forming loops in the intermediate coupling element of FIG. 19 could alternatively be linked up to form one closed conductive winding 241 (i.e. a conductive winding in which the ends are connected to each other), as shown in FIG. 21, or multiple closed conductive windings, as shown in FIG. 22 in which the conductive track forms four conductive wings 251a-251d, in which each conductive winding forms balanced sets of clockwise and counter-clockwise loops with respect to a uniform background magnetic field. For the intermediate coupling elements of FIGS. 21 and 22, rather than shielding the receive aerials from background magnetic fields, the balancing of the conductive windings with respect to background magnetic fields results in no net current flows in the intermediate coupling element due to the background alternating magnetic field. As such, rather than balancing the shielding effect of the intermediate coupling element with respect to the conductive windings of the receive aerial, the intermediate coupling elements of FIGS. 21 and 22 effectively remove altogether the shielding effect of the intermediate coupling element to alternating background magnetic fields. Given that the receive aerials themselves are balanced with respect to background magnetic fields, noise in the receive aerials caused by an alternating background magnetic field is substantially avoided. Accordingly, for embodiments utilising the intermediate coupling element of FIG. 3, the intermediate coupling element of FIG. 21 or FIG. 22 could alternatively be used.

In the example of FIGS. 12 to 14, each loop of the first set of loops is diametrically opposite a loop of the second set of current loops. In some embodiments, the different segments can be rotated relative to each other by any multiple of half the periodicity of the conductive pattern of the intermediate coupling element.

Although in all the examples given above the receive aerial has both a sine winding and a cosine winding, this is not essential and just one of the sine winding and the cosine winding could be used. In such arrangements, a feedback signal could be utilised to vary the magnitude of the oscillating drive current applied to the transmit aerial so that position information can be derived from just the current flowing in the single sine/cosine winding. The above embodiments are to be understood as illustrative examples of the present disclosure.

Further embodiments of the present disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A rotary position sensor comprising a first member and a second member, the first member having a transmit aerial and a receive aerial and the second member having an intermediate coupling element,
the transmit aerial comprising at least one conductive winding arranged to form a first loop aligned with a first minor arc of a circle centered on the axis of rotation and a second loop diametrically opposed to the first loop and aligned with a second minor arc of the circle centered on the axis of rotation, wherein current flows through the first loop and the second loop in opposing rotational senses so that alternating current flowing in the at least one conductive winding generates a transmit alternating magnetic field,
the receive aerial comprising at least one conductive winding arranged to form a first set of current loops and a second set of current loops arranged so that current flowing in the conductive winding flows in a first rotational sense in the first set of current loops and in a second rotation sense opposing the first rotational sense in the second set of current loops, and
the intermediate coupling element comprising regions of conductive material and regions of ferromagnetic material arranged in a pattern such that the current induced in the conductive winding of the receive aerial by the magnetic field generated by the transmit aerial varies in dependence on the relative rotary position of the first and second members;
wherein the regions of ferromagnetic material comprises a thin layer of ferromagnetic material, the thin layer of ferromagnetic material having a thinness such that an alternating background magnetic field will pass through the intermediate coupling element;
wherein the pattern of the intermediate coupling element is arranged such that any electromotive force induced in the first set of current loops by the background alternating magnetic field is substantially balanced by electromotive force induced in the second set of current loops by the background alternating magnetic field.

2. The rotary position sensor according to claim 1, wherein the conductive winding of the receive aerial is a first conductive winding, and
wherein the receive aerial further comprises a second conductive winding arranged so that the relative magnitudes of the currents induced in the first and second windings is indicative of the relative rotary position of the first and second members,
the second conductive winding being arranged to form a third set of current loops and a fourth set of current loops arranged so that current flowing in the second conductive winding flows in a first rotational sense in the third set of current loops and in a second rotation sense opposing the first rotational sense in the fourth set of current loops,
wherein the pattern of the intermediate coupling element and the layout of the third set of current loops and the fourth set of current loops are mutually arranged such that any electromotive force induced in the third set of current loops by a background alternating magnetic field is substantially balanced by electromotive force induced in the fourth set of current loops by the background alternating magnetic field independent of the relative rotary position of the first and second members.

3. The rotary position sensor according to claim 1, further comprising:
excitation circuitry arranged to supply an oscillating electrical signal to the transmit aerial; and
processing circuitry arranged to process current flowing in the receive aerial to generate an output signal indicative of the relative rotary position of the first and second members.

4. The rotary position sensor according to claim 3, wherein the excitation circuitry and the processing circuitry are integrated in a semiconductor integrated circuit device.

5. A method of sensing the relative rotary position of a first member and a second member, the method comprising:
supplying an oscillating excitation signal to a transmit aerial formed on the first member, the transmit aerial comprising at least one conductive winding arranged to form a first loop aligned with a first minor arc of a circle centered on the axis of rotation and a second loop diametrically opposed to the first loop and aligned with a second minor arc of the circle centered on the axis of rotation, wherein current flows through the first loop and the second loop in opposing rotational senses so that alternating current flowing in the at least one conductive winding generates a transmit alternating magnetic field,
processing at least one signal from a receive aerial formed on the first member as a result of current induced by the transmit alternating magnetic field in an intermediate coupling element formed on the second member,
wherein the receive aerial comprises a conductive winding arranged to form a first set of current loops and a second set of current loops arranged so that current flowing in the conductive winding flows in a first rotational sense in the first set of current loops and in a second rotation sense opposing the first rotational sense in the second set of current loops,
wherein the intermediate coupling element comprises a conductive material arranged in a pattern such that the electromotive force induced in the conductive winding of the receive aerial by the transmit alternating magnetic field varies in dependence on the relative rotary position of the first and second members,
wherein the pattern of the intermediate coupling element and the layout of the first set of current loops and the second set of current loops are mutually arranged such that any electromotive force induced in the first set of current loops by a background alternating magnetic field is substantially balanced by electromotive force induced in the second set of current loops by the background alternating magnetic field independent of the relative rotary position of the first and second members, and
wherein the conductive material of the intermediate coupling element comprises one or more closed conductive windings, each closed conductive winding comprising a balanced set of clockwise and counter-clockwise loops with respect to a uniform background magnetic field.

6. A rotary position sensor comprising a first member and a second member, one of the first and second members having a transmit aerial and a receive aerial and the other of the first and second members having an intermediate coupling element,
the transmit aerial comprising at least one conductive winding arranged to form a first loop aligned with a first minor arc of a circle centered on the axis of rotation and a second loop diametrically opposed to the first loop and aligned with a second minor arc of the circle centered on the axis of rotation, wherein current flows through the first loop and the second loop in opposing rotational senses so that alternating current flowing in the at least one conductive winding generates a transmit alternating magnetic field, the receive aerial comprising a conductive winding arranged in a layout having a first set of current loops and a second set of current loops arranged so that current flowing in the conductive winding flows in a first rotational sense in the first set of current loops and in a second rotational sense opposing the first rotational sense in the second set of current loops, and the intermediate coupling element comprising a conductive material arranged in a pattern such that the electromotive force induced in the conductive winding of the receive aerial by the transmit alternating magnetic field varies in dependence on the relative rotary position of the first and second members, wherein the pattern of the intermediate coupling element and the layout of the first set of current loops and the second set of current loops are mutually arranged such that any electromotive force induced in the first set of current loops by a background alternating magnetic field is substantially balanced by electromotive force induced in the second set of current loops by the background alternating magnetic field independent of the relative rotary position of the first and second members;

wherein the conductive material of the intermediate coupling element is arranged in a three-dimensional pattern extending adjacent the extent of the receive aerial to shield the receive aerial from the background magnetic field;

wherein first regions of the conductive material are arranged in closer proximity to the receive aerial than second regions of the conductive material so that the current induced in the conductive winding of the receive aerial by the magnetic field generated by the transmit aerial varies in dependence on the relative rotary position of the first and second.

* * * * *